United States Patent
Scheinberg et al.

(10) Patent No.: US 12,333,809 B2
(45) Date of Patent: Jun. 17, 2025

(54) SYSTEMS AND METHODS FOR LOCATING A GUEST IN A FACILITY FOR ORDER DELIVERY

(71) Applicant: Universal City Studios LLC, Universal City, CA (US)

(72) Inventors: Jeremy Seth Scheinberg, Winter Park, FL (US); Thomas Michael Boessel, Orlando, FL (US); Robert Michael Jordan, Orlando, FL (US); Thomas Owen Williams, Orlando, FL (US); Modesto Alcala, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 374 days.

(21) Appl. No.: 17/877,374

(22) Filed: Jul. 29, 2022

(65) Prior Publication Data

US 2023/0386205 A1   Nov. 30, 2023

Related U.S. Application Data

(60) Provisional application No. 63/347,404, filed on May 31, 2022.

(51) Int. Cl.
  *G06V 20/40*   (2022.01)
  *G06V 40/16*   (2022.01)

(52) U.S. Cl.
  CPC ............ *G06V 20/44* (2022.01); *G06V 40/172* (2022.01)

(58) Field of Classification Search
  CPC .............................. G06V 20/44; G06V 40/172
  See application file for complete search history.

(56) References Cited

U.S. PATENT DOCUMENTS

| | | |
|---|---|---|
| 9,563,914 B2 | 2/2017 | Shreve et al. |
| 9,740,977 B1 * | 8/2017 | Moon ................ G06N 7/01 |
| 10,915,783 B1 * | 2/2021 | Hallman ............ G06N 3/02 |
| 2016/0275470 A1 | 9/2016 | Straw et al. |
| 2019/0205933 A1 | 7/2019 | Glaser et al. |
| 2020/0184278 A1 * | 6/2020 | Zadeh ............... G06N 3/044 |
| 2022/0114514 A1 | 4/2022 | Perkins et al. |

FOREIGN PATENT DOCUMENTS

| | | |
|---|---|---|
| AU | 2020200621 A1 * | 11/2020 |
| WO | 2021057394 A1 | 4/2021 |

OTHER PUBLICATIONS

PCT/US2023/023885 International Search Report and Written Opinion mailed Sep. 11, 2023.

* cited by examiner

*Primary Examiner* — Edward Park
(74) *Attorney, Agent, or Firm* — Fletcher Yoder, P.C.

(57) ABSTRACT

A delivery system may include one or more processors and memory storing instructions executable by the one or more processors to cause the one or more processors to identify one or more attributes of a user in one or more images and associate the one or more attributes of the user with an order placed by the user. The delivery system may also track the one or more attributes of the user in the one or more images over time to identify movement of the user within an environment and in response to the one or more attributes of the user in the one or more images remaining at a location for more than a threshold time, create an association between the one or more attributes of the user and the location. The delivery system may then provide an instruction to deliver items in the order to the location.

20 Claims, 5 Drawing Sheets

SYSTEMS AND METHODS FOR LOCATING A GUEST IN A FACILITY FOR ORDER DELIVERY

CROSS REFERENCE TO RELATED APPLICATION

This application claims priority to U.S. Provisional Application No. 63/347,404, entitled "SYSTEMS AND METHODS FOR LOCATING A GUEST IN A FACILITY FOR ORDER DELIVERY," filed May 31, 2022, the entire contents of which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In a restaurant or dining hall facility, a guest may place an order at an ordering station (e.g., kiosk, register) and be given a card with a printed number. Then, at a later time, a server may search for the card with the printed number (e.g., visually observe the card with the printed number on a table) to deliver the order to the guest. In some cases, the guest may be given an output device (e.g., a buzzer) or use some other output device (e.g., mobile phone; wall-mounted electronic display), and the output device is instructed to provide a notification that indicates that the order is ready at a pickup station. Then, the guest may travel to collect the order at the pickup station. In some cases, the guest may wait for their name to be called, and this is the notification that indicates that the order is ready at the pickup station.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a delivery system may include one or more processors and memory storing instructions executable by the one or more processors to cause the one or more processors to identify one or more attributes of a user in one or more images captured by one or more cameras and associate the one or more attributes of the user with an order placed by the user. The delivery system may also track the one or more attributes of the user in the one or more images over time to identify movement of the user within an environment and in response to the one or more attributes of the user in the one or more images remaining at a location for more than a threshold time, create an association between the one or more attributes of the user and the location. The delivery system may then provide an instruction to deliver items in the order to the location.

In an embodiment, a method of operating a delivery system may include identifying, using one or more processors, one or more attributes of a user in one or more images captured by one or more cameras and associating the one or more attributes of the user with an order placed by the user. The method may also track using the one or more processors, the one or more attributes of the user in the one or more images over time to identify movement of the user within an environment and create an association between the one or more attributes of the user and the location in response to the one or more attributes of the user in the one or more images remaining at a location for more than a threshold time. The method may then provide an instruction to deliver items in the order to the location.

In an embodiment, a delivery system may include one or more processors and memory storing instructions executable by the one or more processors to cause the one or more processors to identify one or more attributes of a user in one or more images captured by one or more cameras and associate the one or more attributes of the user with an order placed by the user. The processors may also track the one or more attributes of the user in the one or more images over time to identify movement of the user within an environment and in response to the one or more attributes of the user in the one or more images remaining at a location for more than a threshold time, create an association between the one or more attributes of the user and the location. The processor may then provide an output that indicates the location to facilitate delivery of items in the order to the location without displaying the one or more images to personnel associated with the environment.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a flowchart of an embodiment of a process for associating the one or more attributes of the guest with the

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure generally relates to systems and methods for receiving and delivering an order in an environment, such as a dining environment. The dining environment may include a variety of features, such as vendors (e.g., restaurants, bakeries, ice cream stalls), merchants (e.g., retailers for clothing, accessories, and/or souvenirs), stations (e.g., drinks, condiments, utensils, hand sanitizer, trash), restrooms, and/or tables to provide a seamless and efficient dining experience for a guest (e.g., customer). A delivery system may be used to supplement or complement the features of the dining environment to receive the order from the guest and to facilitate delivery of the order to the guest. In an embodiment, the delivery system may facilitate delivery of the order to the guest in a passive manner (e.g., passive for the guest; the guest only needs to place the order and then walk to a table). For example, the delivery system may facilitate delivery of the order to the guest without providing a physical object (e.g., a card with a printed number, a buzzer, a radiofrequency tag or reader) to the guest upon receipt of the order and/or without a notification to the guest (e.g., calling a name, a sound output, a light output, a haptic output, a text message). Further, in an embodiment, the guest does not need to have or use their mobile phone for location tracking and/or linking to the order.

Advantageously, the guest may place the order with a vendor at a point of sale terminal. The order may include one or more items (e.g., food, toys, beverages). After placing the order, the guest may move within the dining environment to select a location (e.g., table, seat) for a dining experience. For example, the guest may sit down at a table for a meal, and the guest may wait for the one or more items in the order to be delivered to the location. The delivery system may identify one or more attributes of the guest (e.g., while the guest places the order) and associate the one or more attributes with the order placed by the guest. The delivery system may receive image data of the dining environment and track the one or more attributes within the dining environment. After the guest selects the location, such as sitting down at the table, the delivery system may associate the one or more attributes of the guest with the location, thereby associating the order with the location. After the order is completed (e.g., the one or more items in the order is ready for delivery to the guest), the delivery system may provide instructions to a server (e.g., personnel, employee) to deliver the one or more items in the order to the location.

In an embodiment, the guest may select a location (e.g., table, seat), and then leave to visit a temporary location (e.g., restroom, station, merchant, hand sanitizing station). For example, the guest may sit down at the table, but then walk over to a vending machine to purchase a drink. The delivery system may associate the one or more attributes of the guest with the table, and may determine whether leaving the table breaks the association. The delivery system may consider any of a variety of factors to determine whether being at the table creates the association and/or whether leaving the table breaks the association. The factors may include a respective time at the table, a respective time away from the table, a type of the temporary location, movement or gestures made by the guest at the table, any items placed on the table, any other guests at the table, and the like. For example, the guest may leave an object (e.g., water bottle) at the table to claim it as their table. As such, the delivery system may determine that the guest may return to the table and maintain the association of the one or more attributes of the guest with the table.

However, the guest may move from a first location (e.g., a first table) to a second location (e.g., a second table). For example, the guest may determine a first table to be too small. As such, the guest may choose to move from the first table to a second table. The delivery system may determine that this movement of the guest from the first table to the second table is a break event. That is, the delivery system may break the association between the one or more attributes of the guest with the first table. In an embodiment, the delivery system may then associate the one or more attributes of the guest with the second table.

In an embodiment, the delivery system may associate the one or more attributes of the guest with the location in response to the guest spending a period of time at the location that meets or exceeds a threshold period of time (e.g., dwell time). For example, the guest may sit down at a table for a period of time that meets or exceeds the threshold period of time, and then the delivery system may associate the one or more attributes of the guest with the table. The threshold period of time may vary based on any of a variety of factors, such as movement or gestures made by the guest at the table, any items placed on the table, any other guests at the table, a respective time spent at other locations visited between the point of sale and the location, and the like. For example, the guest may sit down at the table, place their bag on the table, and start playing on their mobile phone, which may indicate an intent to remain at the table during the dining experience and may cause the delivery system to reduce threshold period of time (e.g., as compared to another guest who stands at the table, does not place their bag on the table, and/or continues to look around the dining environment instead of playing on their mobile phone). In another example, the guest may stand by the table while the guest waits for previous occupants of the table to clear the table and leave. Because the guest is in a standing position, the delivery system may increase the threshold period of time (e.g., as compared to another guest who sits at the table). As noted herein, when the order is complete, the delivery system may provide a server with instructions to deliver the order to the location.

In an embodiment, a group of guests may visit the dining environment. For example, a family unit may visit the dining environment for a family meal. The family unit may visit the point of sale terminal of the vendor to place their order. A member of the family unit may place the order for all members of the family unit. The delivery system may identify one or more attributes for at least one member of the family unit (e.g., the member who placed the order). In another example, the group of guests may visit the dining environment and separately place orders. Each member of the group may individually place their order at the point of sale terminal of the vendor. That is, members of the group may visit different vendors and/or place different orders at different terminals of a same vendor. Although the group may visit separate point of sale terminals, the group may regroup or reconvene at a same location (e.g., one table) within the dining environment. The delivery system may track the one or more attributes for each member as they travel within the dining environment. For example, one member (e.g., the same or different from the member who placed the order) may claim a table for the group, while other members of the group may visit a condiment station, a utensil station, a restroom, another vendor, or the like. The delivery system may determine that the member at the table may be claiming the table for the group, as such the delivery system may associate the order with the table. Further, the delivery system may associate all of the orders of the group with the member at the table. As such, the delivery system may provide instructions to deliver all orders of the group to the member at the table.

Embodiments of the present disclosure are directed to a delivery system that utilizes computer vision techniques to associate one or more attributes of a guest with an order made by the guest. Then, the delivery system utilizes the computer vision techniques to identify a location of the one or more attributes within a dining environment, which then enables the delivery system to associate the order to the location. The delivery system may track movement of the guest within the dining environment based on the one or more attributes. The attributes of the guest may be anonymous attributes, such as a hair color, a clothing color, a clothing item, a gait, a personal item, an accessory, or the like. That is, the attributes may not include personally identifiable information (PII). The term PII may include information that directly identifies an individual (e.g., name, address, social security number, telephone number) or data elements regarding the individual (e.g., a combination of gender, race, birth date, geographic indicator). As described herein, the delivery system may identify one or more attributes of the guest following a completed order, associate the one or more attributes with the order, track the one or more attributes within the dining environment to associate a location with the one or more attributes, and provide instructions to deliver the order to the location. In other words, the delivery system may associate the order with the location of the guest within the dining environment. Accordingly, the delivery system may facilitate delivery of orders without certain types of visual indicators that are provided to the guest within the dining environment for tracking purposes (e.g., cards with printed numbers, which may be reused by multiple guests over time) and/or without notifications to the guest.

Figure 1:
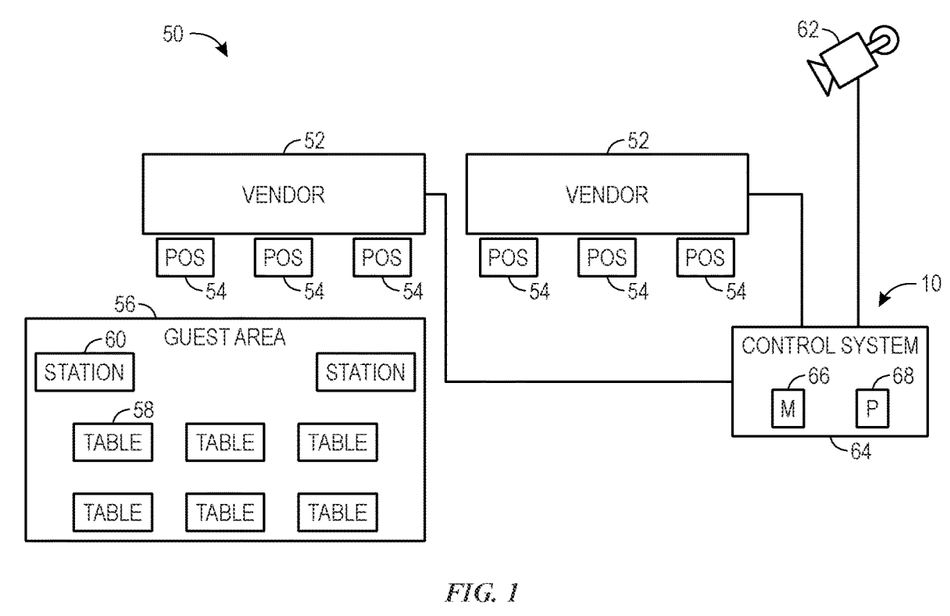
FIG. 1 is a schematic diagram of an embodiment of a delivery system that may be used a dining environment, in accordance with an aspect of the present disclosure.

With the preceding in mind, FIG. 1 is a schematic diagram of an embodiment of a delivery system 10 that may be used in a dining environment 50, such as a food hall, a food court, a dining hall, a food truck park, an amusement park, or the like. The dining environment 50 may include an open space, such as a walkable area (e.g., a queue or line) where guests may visit a vendor(s) 52, create the order at the point of sale terminal(s) 54 of the vendor(s) 52, select a table(s) 58, visit a station(s) 60, or otherwise navigate through the dining environment 50. The dining environment 50 may include an entrance and exit for the guests to enter or leave the premises. The vendor(s) 52 may include a restaurant, a food truck, a dessert shop (e.g., bakery, ice cream shop), a beverage shop (e.g., juice shop), or the like. The vendor(s) 52 may include the point of sale terminal(s) 54 that may receive orders from the guests. Each point of sale terminal 54 may be a kiosk and/or a mobile device, such as a tablet. It should be appreciated that at least one of the point of sale terminals 54 may include a mobile device, such as a mobile phone, that is owned/carried by one of the guests and that uses an application to interact with the control system 64 or other vendor system to place the order. Each point of sale terminal 54 may display a menu of the vendor 52 and allow the guests to complete transactions (e.g., place an order) with the vendor 52. The point of sale terminal(s) 54 may also be operated by and/or include a server (e.g., human server) who may take the orders from the guests and create the orders with the mobile device.

The dining environment 50 may also include a guest area 56 where various guests may be located. The guest area 56 may include the table(s) 58 that guests may sit at or stand next to during their dining experience. For example, the guests may sit at the table(s) 58 to eat a meal. The table(s) 58 may include or be associated with one or more chairs, which may be movable chairs (e.g., not secured to a ground or to the table(s) 58) and/or stationary chairs (e.g., bolted or fastened to a ground or to the table(s) 58; picnic benches, metal chairs, wooden chairs). The station(s) 60 may be a temporary location(s) that the guests visit, typically before or after selecting the table(s) 58. The station(s) 60 may include a restroom, a merchant or retailer, a hand sanitizing station, a condiment station, a utensil station, a trash station, a drink fountain, or the like. For example, the guests may visit the condiment station to get ketchup, barbeque sauce, salt, pepper, or the like. The guests may also visit the restroom before sitting at the table(s) 58. After the dining experience, the guests may clear their table and bring any trash to the trash station before leaving the dining environment 50.

In certain embodiments, the dining environment 50 may include one or more cameras 62 that generate image data (e.g., moving image data, such as video data) of the dining environment 50. The one or more cameras 62 may transmit the image data to a control system 64 (e.g., electronic control system) for processing (e.g., image analysis, machine learning, artificial intelligence, computer vision). The one or more cameras 62 and the control system 64 may form the delivery system 10. In operation, the delivery system 10 generates and processes the image data of the dining environment 50 to identify one or more attributes of the guests. Further, the delivery system 10 may be trained with machine learning algorithms or artificial intelligence to understand and/or make predictions related to guest locations in the dining environment 50 (e.g., whether to establish an association between an order and a location and/or whether to break the association between the order and the location). For example, the delivery system 10 may be trained with historical and/or modeled data representative of the dining environment 50 to understand patterns of human behavior for selecting a location and/or for leaving the location.

The control system 64 may include a memory 66 and one or more processors 68 (e.g., processing circuitry). The memory 66 may include volatile memory, such as random-access memory (RAM), and/or non-volatile memory, such as read-only memory (ROM), optical drives, hard disc drives, solid-state drives, or any other non-transitory computer-readable medium that includes instructions to operate the delivery system. The memory 66 may also include a database of attributes (e.g., characteristics, such as identifiable objects, movements, gestures, clothing colors, gait, head shape; threshold time periods), a map (e.g., facility map of the dining environment 50), patterns of human behavior, historical data, machine learning algorithms, and/or other types of information for the control system 64. The processing circuitry 68 may be configured to execute the instructions. For example, the processing circuitry 68 may include one or more application specific integrated circuits (ASICs), one or more field programmable gate arrays (FPGAs), one or more general purpose processors, or any combination thereof.

The delivery system 10 may generate image data (by cameras 62) and identify an order placed by a guest at the point of sale terminal 54. The delivery system 10 may receive indication of the order based on the image data and/or based on information provided to the delivery system 10 by the point of sale terminal 54 (e.g., the control system 64 is communicatively coupled to the one or more cameras 62 and/or the point of sale terminal 54 via a wireless or wired network). For example, the delivery system 10 may process the image data to determine that the guest is interacting with the point of sale terminal 54 (e.g., the guest is scrolling through a menu at the point of sale terminal 54) and/or that the guest has placed the order (e.g., an order number/identifier is displayed on a screen of the point of sale terminal 54 and captured in the image data). That is, after entering payment information, the point of sale terminal 54 may display text on the screen notifying the guest of the completed transaction. For example, the point of sale terminal may display, 'THANK YOU FOR ORDERING,' or 'ORDER NUMBER 123 IS CONFIRMED,' or the like. The delivery system 10 may identify this screen in the image data and identify the order. Additionally or alternatively, the delivery system 10 may receive information from the point of sale terminal 54, such as information that the guest has selected one or more items from the menu and/or that the guest has entered payment information to place the order (e.g., the order number/identifier is communicated to the control system 64). The delivery system 10 may associate a number or other identifier with the order. For example, the order may be 'Order No. 123.' In an embodiment, the delivery system 10 may also associate a time and/or a location of the point of sale terminal 54 of order creation.

While the guest is placing and/or upon placement of the order, the delivery system 10 may identify one or more attributes of the guest and associate the one or more attributes of the guest with the order. As described further in FIG. 3, the one or more attributes may be appearance indicators and may not include personally identifiable information (PII). For example, the delivery system 10 may identify a hair color of the guest, a relative height or size of the guest, a head shape of the guest, a gait of the guest, a clothing color of the guest, and/or an object (e.g., personal possession) of the guest. The one or more attributes may be sufficient to enable differentiation between multiple different guests for tracking purposes within the dining environment 50 but may not indicate or include PII.

Figure 4:
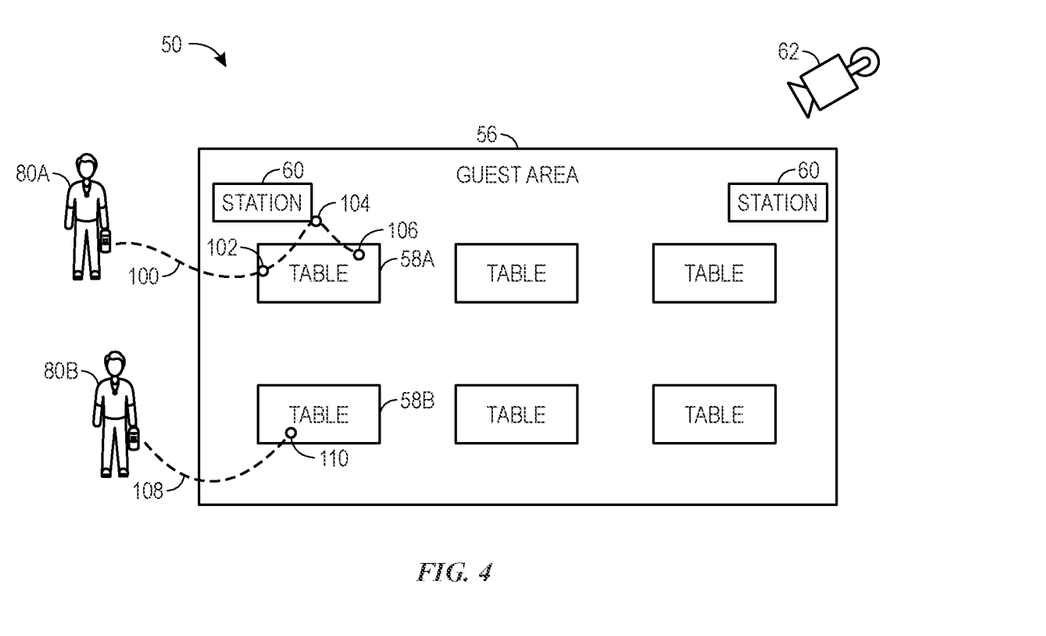
FIG. 4 is a schematic illustration of the delivery system and the dining environment of FIG. 1 that shows an association of a location of the dining environment with the one or more attributes of the guest, in accordance with an aspect of the present disclosure.
Figure 7:
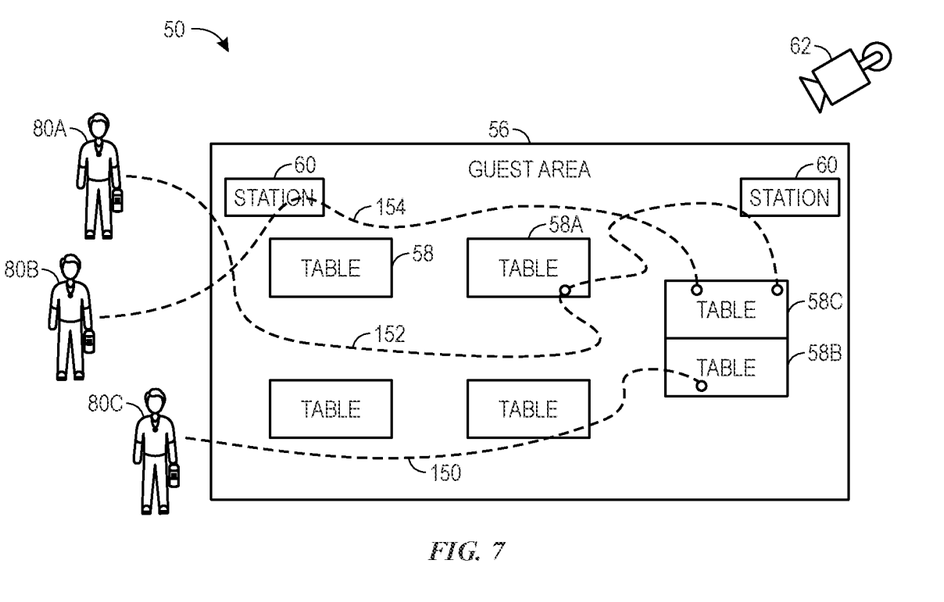
FIG. 7 is a schematic illustration of the delivery system and the dining environment of FIG. 1 that shows a group of guests, in accordance with an aspect of the present disclosure.

As further described in FIGS. 4 and 7, the delivery system 10 may implement machine learning or computer vision techniques to understand patterns of human behavior and associate the one or more attributes of the guest with a location within the dining environment 50. In this way, the delivery system 10 may associate the order with the location of the guest. For example, the guest may complete the order at the point of sale terminal 54, select the table 58, and wait for their order. The delivery system 10 may associate the one or more attributes of the guest with the table 58 and provide instructions to deliver the order to the table 58. In another example, the guest may select the table 58, leave an object, then go to the station 60. The delivery system 10 may associate the guest with the table 58, even though the guest left. The delivery system 10 may identify the object of the guest 80 on the table 58 and determine that the guest may return.

In an embodiment, the delivery system 10 may be configured to provide instructions (e.g., audible instruction via a speaker and/or visible instructions via a display) to the vendor(s) 52 to facilitate delivery of items of the order to the guest. For example, after ordering, the guest may travel to the guest area 56 and sit at the table 58. The delivery system (via the control system 64) may store or have access to a map of the dining environment 50. The map may associate objects within the dining environment 50 with a respective identifier, such as a letter, number, or a shape. For example, the tables 58 may be labeled A-F, respectively. In another example, the tables 58 may be labeled with a letter and a number, such as A1, A2, A3, B1, B2, and B3, respectively. Further, a seat of the tables 58 may be assigned a letter, number, or both. For example, an instruction may be to provide Order 123 to Table A1, Seat 3, or provide Order 98 to Table A1, Seat J. Accordingly, the delivery system 10 may facilitate delivery of orders using the image data and/or the map.

To ensure accurate instructions, the delivery system 10 may passively update the map of the dining environment 50. For example, the one or more cameras 62 may continuously generate image data of the dining environment 50 while tracking the one or more attributes of the guest. The delivery system 10 may also identify a configuration or orientation of the tables 58 and/or a status of the tables 58 to update the map of the dining environment 50. For example, the guest may push one or more tables 58 together. The delivery system 10 may identify the combined tables in the image data and update the map, including the respective identifiers for the objects within the dining environment 50. In another example, the delivery system 10 may identify one or more unavailable tables from the image data (e.g., waiting for dishes to be cleared) and understand that future guests may not want to sit at the one or more unavailable tables. In an instance, the delivery system 10 may output a notification to the vendor 52 of the unavailable tables. In this way, the delivery system 10 may have a real-time or near real-time understanding of the dining environment 50 and provide accurate instructions for order delivery.

It should be appreciated that the layout and arrangement of the dining environment in FIG. 1 is merely exemplary, and the delivery system 10 may be used with any of a variety of dining environments that are arranged in any suitable manner. Moreover, certain components of the delivery system 10 may be shared between the vendors 52 and/or respective components of the delivery system 10 may be provided for each vendor (e.g., one or more cameras 62 for one vendor and one or more cameras 62 for another vendor). Indeed, the delivery system 10 may be shared between/in communication with multiple dining environments 50 or may be dedicated to its own dining environment 50.

Figure 2:
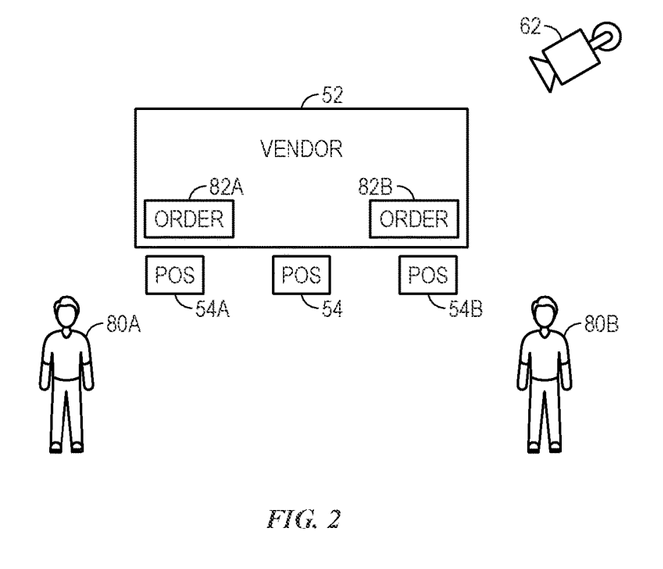
FIG. 2 is a schematic illustration of a guest creating an order at a point of sale terminal via the delivery system of FIG. 1, in accordance with an aspect of the present disclosure.

With the foregoing in mind, FIG. 2 is an example illustration of a guest 80 creating and placing an order 82 at the point of sale terminal 54 of the vendor 52. For example, the guest 80 may view a menu or a list of items (e.g., goods, such as food, toys) that the vendor 52 sells at the point of sale terminal 54. The guest 80 may also select one or more items for purchase to create the order 82. The point of sale terminal 54 may be a kiosk, a self-checkout station, a mobile device of the guest 80, or the like. For example, the kiosk may include a display screen that displays a menu provided of the vendor 52. The guest 80 may scroll through the menu and select one or more items for the order 82. To finalize the order 82, the guest 80 may enter a payment (e.g., credit card information, cash, electronic transfer). For example, the guest 80 may swipe the credit card or the debit card through a card reader on the kiosk or the guest 80 may insert cash into the kiosk. The kiosk may then display a confirmation message, such as 'ORDER COMPLETED,' 'THANK YOU FOR YOUR ORDER,' 'ORDER NUMBER 123 CONFIRMED' or the like. As described herein, the delivery system 10 may analyze image data (from the one or more cameras 62) and identify the confirmation message.

With the foregoing in mind, the dining environment 50 may include two guests (e.g., a first guest 80a, a second guest 80b). It may be beneficial for the control system 64 to distinguish between the guests 80a, 80b to accurately deliver orders. For example, the guests 80a, 80b may visit the vendor 52 and/or the point of sale terminals 54. For example, the first guest 80a may visit a first point of sale terminal 54a to create an first order 82a. Upon confirmation of the first order 82a, the delivery system 10 may identify one or more attributes of the first guest 80a and associate the attributes with the first point of sale terminal 54a and the first order 82a. Similarly, the delivery system 10 may associate one or more attributes of the second guest 80b with a second point of sale terminal 54b and/or a second order 82b. The delivery system 10 may track the one or more attributes of the first guest 80a and the second guest 80b within the dining environment 50 for order delivery.

In an embodiment, the delivery system 10 may not associate the first guest 80a and the second guest 80b as members of a group. For example, the delivery system 10 may recognize that the first guest 80a arrived before the second guest 80b. In another example, the delivery system 10 may identify the first guest 80a as already a member of a group (e.g., that does not include the second guest 80b). In an embodiment, the delivery system 10 may associate the first guest 80a and the second guest 80b as members of the same group. For example, the first guest 80a and the second guest 80b may arrive together at the dining environment 50 and/or interact with one another in the dining environment 50 (e.g., prior to placing the orders 82a, 82b). The first guest 80a and the second guest 80b may choose to create their own orders at the point of sale terminals 54. The delivery system 10 may also associate the first order 82a placed by the first guest 80a with the second order 82b placed by the second guest 80b. In this way, the delivery system 10 may have additional data points for determining a location of the group (e.g., to the deliver the orders 82a, 82b). As further described with reference to FIG. 4, the first guest 80a and the second guest 80b may take different routes (e.g., paths) to get to a location.

Figure 3:
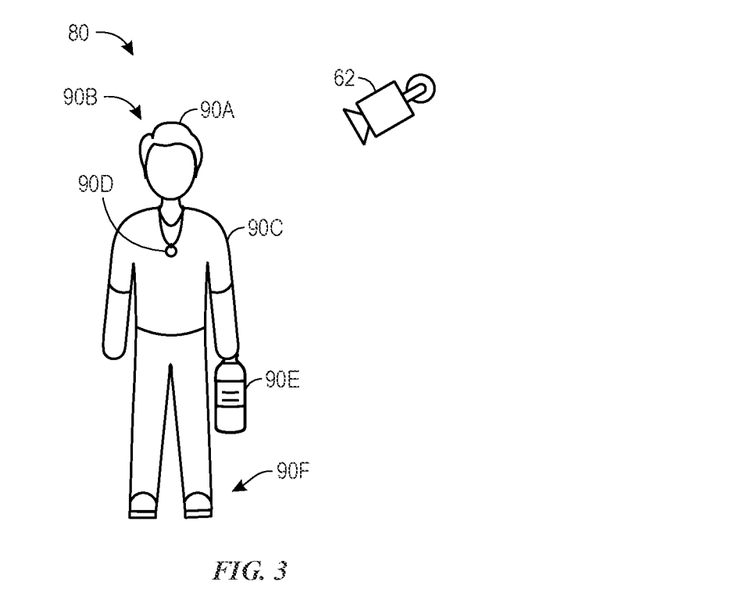
FIG. 3 is a schematic illustration one or more attributes of the guest that may be identified by the delivery system of FIG. 1, in accordance with an aspect of the present disclosure.

FIG. 3 is an example illustration of one or more attributes of the guest 80 that may be identified and/or used by the delivery system 10 of FIG. 1 for tracking the guest 80. The one or more attributes may be anonymous attributes or appearance indicators, rather than PII. For example, the delivery system 10 may identify a hair color or hairstyle 90a, a head shape 90b, a clothing item shape and/or color 90c, an accessory 90d, an object (e.g., personal possession) 90e, a gait 90f, or the like.

For example, the delivery system 10 may identify the hair color 90a of the guest 80. The hair color 90a may include black, gray, white, brown, blonde, red, or a combination thereof. The hairstyle 90a may include a braid, a ponytail, bangs, bald/lack of hair, or the like. The head shape 90b may be a shape of the guest's face, such as heart shaped, square shaped, oval, diamond, triangle, or the like. The head shape 90b may also include head or facial accessories, such as glasses, hats, piercings, or the like. In an embodiment, the delivery system 10 may use a combination of hair color and/or hairstyle 90a and head shape 90b as the one or more attributes of the guest 80. Additionally or alternatively, the delivery system 10 may identify the clothing color 90c of the guest 80. For example, the delivery system 10 may identify a color of the clothing, a pattern of the clothing, a design on the clothing, or the like. For example, the guest 80 may wear a shirt with a slogan, a cartoon character, or a graphic design.

In an embodiment, the delivery system 10 may identify one or more accessories 90d of the guest 80. For example, the one or more accessories 90d may include earrings, a necklace, a bracelet, a ring, a scarf, a hair clip, a tie clip, a belt, sunglasses, and/or other accessory worn by the guest 80. In the illustrated embodiment, the delivery system 10 may identify a necklace with a charm. Additionally or alternatively, the delivery system 10 may identify one or more personal possessions 90e of the guest 80. The one or more personal possessions 90e may include a purse, a phone, a wallet, a jacket, a backpack, a water bottle, and/or other object carried by the guest 80. The one or more personal possessions 90e may also include a baby stroller, a pair of crutches, a wheelchair, and/or other object transported with the guest 80. For example, the delivery system 10 may identify a water bottle as the personal possession 90e. As described herein, the delivery system 10 may track the personal possession 90e within the dining environment 50 to determine the location of the guest 80.

In an embodiment, the delivery system 10 may track the gait 90f of the guest 80. For example, the delivery system 10 may recognize, distinguish, and associate a walking gait 90f with the guest 80. For example, the guest 80 may walk faster or slower relative to an average walking speed. In another example, the guest 80 may take larger or smaller steps relative to an average step length. In another example, some guests 80 may have a unique walking style, such as skipping, bouncing, running, limping, or the like. The delivery system 10 may be trained (e.g., by artificial intelligence or machine learning) to identify the walking gait 90f with the guest 80. The one or more attributes 90 may also include a size (e.g., estimated absolute size and/or relative size) of the guest 80. For example, the guest may be a child or a teenager that may be smaller relative to other guests. In another example, the guest may be a basketball player and taller than other guests.

The delivery system 10 may track multiple attributes of the guest 80 within the dining environment 50. For example, the delivery system 10 may track the size and the walking gait 90f of the guest 80. In an instance, a taller guest may have a longer stride than a smaller guest. In another example, the delivery system 10 may track the hair color 90a, the accessories 90d, and the personal possession 90e. The delivery system 10 may track any number and/or combination of attributes 90 of the guest 80. The delivery system 10 may also track different attributes 90 for different guests to thereby efficiently track the attributes 90 that best differentiate the guests.

With the foregoing in mind, FIG. 4 is an example illustration of the delivery system 10 tracking the first guest 80a and the second guest 80b within the dining environment 50. For example, the first guest 80a may walk to the guest area 56, select a table 58a, visit a station 60, and then return to the table 58a to wait for their order. As described herein, the delivery system 10 may identify and track the one or more attributes 90 of the guests 80a, 80b within the dining environment 50 to provide instructions for order delivery.

For example, the first guest 80a may travel within the dining environment 50 along a route 100. The first guest 80a may enter the guest area 56 and visit a first table 58a, as represented by point 102. The first guest 80a may spend a period of time at the first table 58a to establish ownership of the first table 58a. The delivery system 10 may compare the period of time at the first table 58a to a threshold period of time. In response to the period of time at the first table 58a meeting or exceeding the threshold period of time, the delivery system 10 may associate the one or more attributes of the first guest 80a with the first table 58a. Thus, the delivery system 10 may also associate the order 82a with the first table 58a. In other words, the delivery system 10 may determine that the first table 58a is the location for delivery of the order 82a. The first guest 80a may leave the first table 58a and visit the station 60, as represented by point 104. The delivery system 10 may identify the station 60 as a temporary location (e.g., as stored or labeled in a database accessible by the delivery system 10). In another example, the first guest 80a may leave a personal possession 90e at the first table 58a to claim the table. The delivery system 10 may identify the personal possession 90 on the first table 58a as a claim to the table, and the delivery system 10 may associate the one or more attributes 90 of the first guest 80a with the first table 58a. The delivery system 10 may not break the association of the one or more attributes 90 of the first guest 80a, or the order 82a of the first guest 80a, with the first table 58a. Then, as represented by point 106, the first guest 80a may return to the table 58a.

At the same time or another time, the second guest 80b may go directly to a second table 58b along route 108. As represented by point 110, the second guest 80b may take a seat at the second table 58b and start browsing a mobile device, talking to other guests at the second table 58b, and/or taking some other action/gesture/movement that indicates an association with the second table 58b. The delivery system 10 may identify one or more attributes 90 of the second guest 80b. After the second guest 80b sits at the second table 58b, the delivery system 10 may associate the one or more attributes 90 of the second guest 80b with the second table 58b. The delivery system 10 may continuously monitor the image data to determine if a break event occurs, such as if the first guest 80a and/or the second guest 80b switches tables, leaves the dining environment 50, or the like. If the break event does not occur, the delivery system 10 may provide instructions to deliver the orders 82a, 82b to the first and second tables 58a, 58b, respectively.

Figure 5:
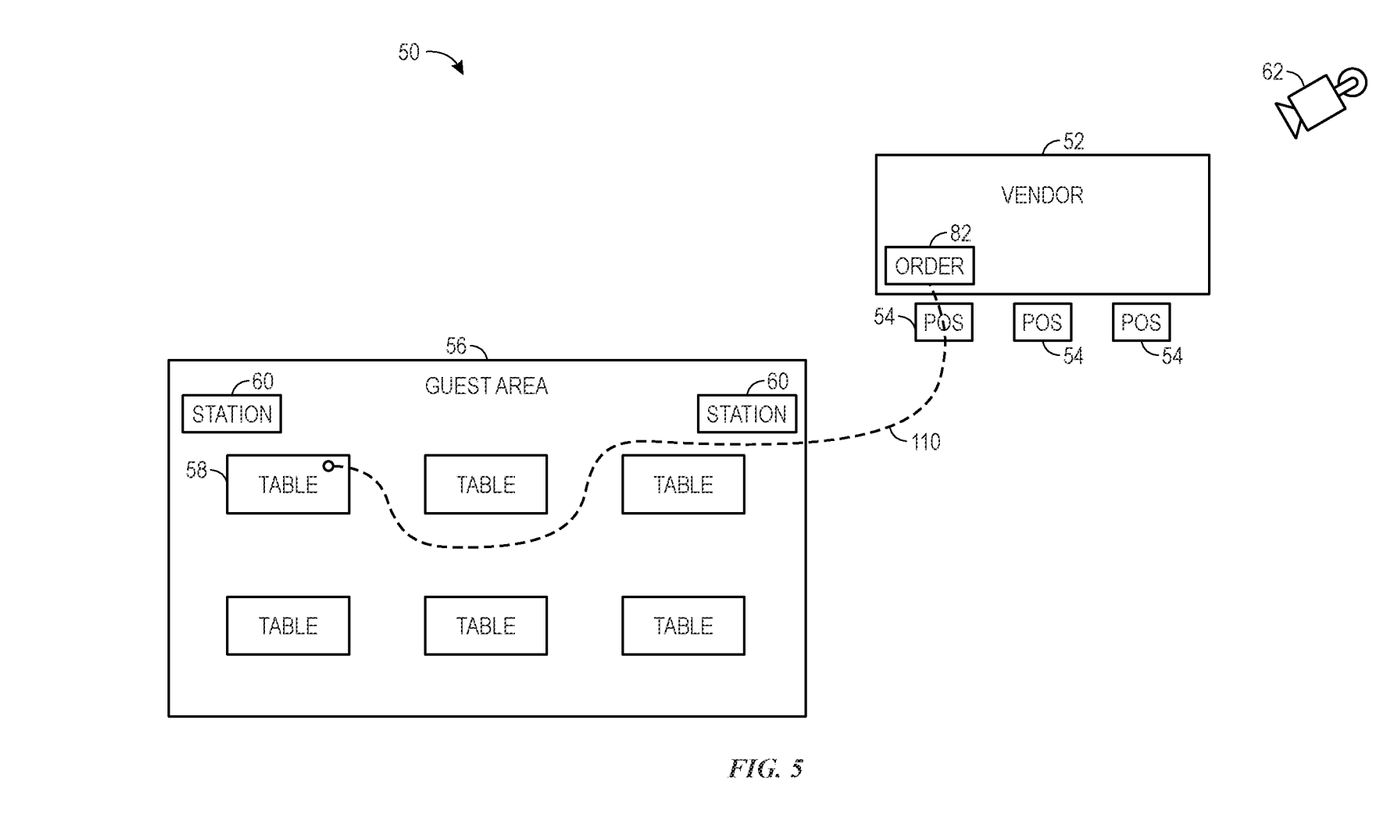
FIG. 5 is a schematic illustration of the delivery system and the dining environment of FIG. 1 that shows delivery of the order to the guest, in accordance with an aspect of the present disclosure.

FIG. 5 is an example illustration of the delivery system 10 providing instructions to facilitate delivery of the order 82 to the location of the guest 80. For example, the guest 80 may place the order 82 at the point of sale terminal 54 of the vendor 52 and the delivery system 10 may identify one or more attributes of the guest 80. The vendor 52 may receive the order 82 and create the order 82. After the vendor 52 prepares the order 82, the vendor 52 may indicate completion of the order 82 to the delivery system 10. The delivery system 10 may provide instructions to the vendor 52 indicative of the location for delivery of the order 82 (e.g., based on a current association of the location with the order 82, via tracking the one or more attributes 90 of the guest 80 who placed the order 82).

For example, the guest 80 may use the point of sale terminal 54 to place an order 82 for a kid's meal, including chicken nuggets and a toy. The vendor 52 may create the order 82 in a kitchen. After the order 82 is completed (e.g., upon receipt of an indication, such as a user input, that the order 82 is completed), the delivery system 10 may provide instructions to deliver the order 82 to the location of the guest 80. However, it should also be appreciated that the delivery system 10 may provide the instructions to deliver the order 82 to the location of the guest 80 in response to (e.g., as soon as) the order 82 being associated with the location (e.g., the guest 80 sits at the location in a manner that causes the delivery system 10 to associate the order 82 with the location). In an embodiment, all items of the order 82 may be made before the order 82 is delivered to the table 58. In other embodiments, each item of the order 82 is delivered as it is made to ensure freshness.

The delivery system 10 may provide the location of the guest 80 to a server of the vendor 52. The server may be a person or an automated delivery system (e.g., remotely controlled or autonomously controlled delivery vehicle). In an embodiment, the person delivering the food may be a staff member of the vendor 52. The person may receive instructions indicative of a table number/identifier, a seat number/identifier, or a combination thereof, within the dining environment 50. For example, the instructions may include a string of text such as, 'TABLE 1, SEAT 3' indicating a farthest left table and a farthest right seat. The delivery system 10 may output (e.g., display, via a device at the vendor 52 and/or carried by the server) a map of the dining environment 50 with the location labeled or otherwise highlighted on the map. As such, the server may use the map to travel to the location. The map of the dining environment 50 may be updated in real-time (e.g., substantially real-time, near-time) based on the image data. Further, the map of the dining environment 50 may include a schematic diagram or an image (e.g., still or moving image) based on the image data. In an embodiment, the one or more attributes 90 of the guest 80 are not disclosed to the server (e.g., hidden from the server; not known by the server), the guest 80 does not have any trackable items provided by the vendor 52 (e.g., no card with a printed number, no buzzer, no RFID tag), and/or the guest 80 does not use their own mobile device to provide location data to the delivery system 10 for delivery of the order 82. Instead, the server may deliver the items in the order 82 to the location based on (e.g., only on) the map and/or the identifier(s) for the location. In this way, the server may not know any attributes of the guest 80 and may not be prompted to visually confirm any attributes of the guest 80 prior to delivery of the order 82 to the location, rather the server may know the location designated for delivery of the order 82 placed by the guest 80. Indeed, the guest 80 does not necessarily need to be present in order for the server to complete the delivery of the order 82 placed by the guest 80 to the location. The computer vision techniques and/or algorithms may be sufficiently accurate and reliable (e.g., via machine learning) to deliver the order 82 without these additional steps or additional burdens on the server (e.g., without the server needing to know and/or visually confirm the attributes of the guest 80). Accordingly, the server may bring the order 82 to the location and then efficiently proceed to handle the orders of other guests.

In an embodiment, the server delivering the order 82 may be include the automated delivery system, such as one or more robots, ground vehicles, aerial vehicles/drones, or any combination thereof. As such, the delivery system 10 may transmit a signal indicative of the location to the automated delivery system to facilitate delivery of the order 82 to the location. The automated delivery system may receive and/or store the map of the dining environment 50, and the delivery system 10 may provide a route from the vendor 52 to the location. The automated delivery system may include one or more sensors (e.g., motion sensors) to identify objects (e.g., people, carts, animals) within the dining environment 50. In an embodiment, the automated delivery system may be programmed with machine learning, artificial intelligence, or computer vision capabilities to interpret and understand the dining environment 50. In this way, the delivery system 10 may provide instructions to provide the order 82 to the location associated with the one or more attributes 90 of the guest 80.

Figure 6:
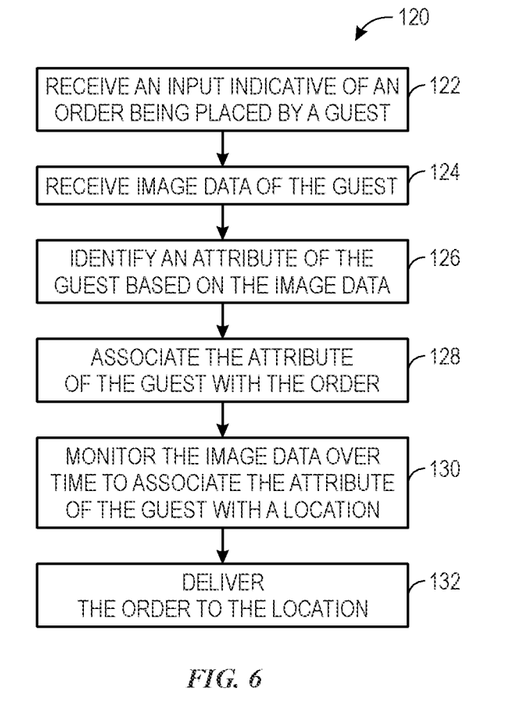
FIG. 6 is a flowchart of an embodiment of a process for delivering the order to the location of the dining environment via the delivery system of FIG. 1, in accordance with an aspect of the present disclosure.

FIG. 6 is an example method 120 for identifying one or more attributes 90 of the guest 80, associating the one or more attributes 90 of the guest 80 with a location, and delivering the order 82 to the location within the dining environment 50. At block 122, the delivery system 10 may receive an input indicative of an order 82 being placed by the guest 80. The delivery system 10 may be communicatively coupled to the point of sale terminal 54. That is, after the guest 80 completes the order 82, the point of sale terminal 54 may transmit a signal to the delivery system 10 indicative of the completed order 82. The delivery system 10 may receive a receipt of the order 82, a confirmation of the order 82, or the like. The delivery system 10 may also identify the point of sale terminal 54 used by the guest 80 to create the order 82. The delivery system 10 may also assign a number or other identifier to the order 82. For example, the order number/identifier may be any combination of numbers or letters, such as 123 or A2.

In another example, the delivery system 10 may receive image data from the one or more cameras 62. The delivery system 10 may process the image data to receive the indication of the order 82 being placed by the guest. For example, the delivery system 10 may process the image data and identify an order confirmation on the display of the point of sale terminal 54 and/or identify the guest 80 holding a payment method. The display of the point of sale terminal 54 may read, "THANK YOU FOR ORDERING," or "ORDER NUMBER 123 CONFIRMED." The delivery system 10 may extract the order number or other identifier for the order 82 from the image data (e.g., via text processing). In another example, the delivery system 10 may identify the guest 80 at the point of sale terminal 54 scrolling through the menu and adding one or more items to a cart. The delivery system 10 may understand that adding items to the cart may lead to the guest 80 checking out and placing the order 82. As such, the delivery system 10 may analyze the image data over time to receive the input indicative of the order 82 being placed. For example, the delivery system 10 may identify image data indicative of the guest 80 interacting with the point of sale terminal 54 or reaching for a wallet to complete the order 82.

In an embodiment, the delivery system 10 may identify the guest 80 at the point of sale terminal 54, but may not receive the input indicative of the order 82. For example, the guest 80 may scroll through the menu on a display of the point of sale terminal 54. However, the guest 80 may walk away from the point of sale terminal 54 without completing the order 82. In another example, the guest 80 may look at the point of sale terminal 54 and walk away without placing the order 82. As such, the delivery system 10 may not isolate or identify attributes of the guest 80 in the image data and may continue processing image data for orders placed by the guests 80.

At block 124, the delivery system 10 may generate and process image data of the dining environment 50 and identify the guest 80. For example, the one or more cameras 62 may generate image data and the control system 64 may process the image data to identify and/or to isolate image data of the guest 80. In an instance, in response to the guest 80 interacting with the point of sale system 54, the delivery system 10 may identify and isolate the image data of the guest 80.

At block 126, the delivery system 10 may identify one or more attributes 90 of the guest 80 based on the isolated image data. As described with reference to FIG. 3, the attributes 90 may be anonymous, appearance indicators. The delivery system 10 may identify one or more attributes 90 (e.g., a combination of attributes that sufficiently distinguish the guest 80 from other guests) and use the one or more attributes 90 to track the guest 80 within the dining environment 50. For example, the guest 80 may be carrying a backpack, have a fast gait, and wear glasses. Further, another guest 80 may have blue hair, a cast on a leg, and/or use crutches. The delivery system 10 may identify the height or size of the guest 80 to be smaller than an average size. The delivery system 10 may estimate the height or size of the guest 80 based on characteristics of the camera 62 (e.g., field of view, location relative to the dining environment 50) and/or characteristics of the dining environment 50 (e.g., a size of the tables 58 within the dining environment 50). In this way, the delivery system 10 may track the guest 80 and other guests travelling within the dining environment 50.

It should be appreciated that the delivery system 10 may receive and analyze the image data while the order 82 is being placed by the guest 80. For example, the delivery system 10 may begin to identify the one or more attributes 90 of the guest 80 upon the guest 80 initiating interaction with the point of sale terminal 54 or otherwise taking steps that typically lead to the order 82 being placed. In one embodiment, the delivery system 10 may identify image data indicative of the guest 80 interacting with the point of sale terminal 54 or reaching for a wallet to complete the order 82, and the delivery system 10 may then begin identifying and creating a profile of the one or more attributes 90 of the guest 80.

At block 128, the delivery system 10 may associate the one or more attributes of the guest 80 with the order 82. For example, the delivery system 10 may associate the one or more attributes 90, such as the backpack, fast gait, and glasses of the guest 80 with the order 82.

At block 130, the delivery system 10 may monitor the image data over time to associate the one or more attributes 90 of the guest 80 with a location. As described with reference to FIGS. 4 and 7, the guest 80 may take any of a variety of routes before selecting a table 58. As such, it may be beneficial for the delivery system 10 to continuously monitor image data to identify the location (e.g., the location for delivery of the order 82) of the guest 80 within the dining environment 50. For example, the guest 80 may first select and sit down at the table 58, then leave the table 58 to visit the station 60. The guest 80 may leave their backpack at the table 58 so that other guests may understand that the table 58 is claimed. Additionally, the delivery system 10 may identify the backpack on the table 58 as an indicator that the guest 80 intends to return to the table 58. As such, the delivery system 10 may associate the one or more attributes 90 of the guest 80 with the table 58.

At block 132, the delivery system 10 may provide instructions to deliver the order 82 to the location. That is, the delivery system 10 may provide instructions to a server of the vendor 52 to deliver the order 82 to the location. For example, the delivery system 10 may provide a notification to the server to bring the order 82 to the table 58. Accordingly, the delivery system 10 may receive the order 82 from the guest 80, track the guest 80 to determine the location for order delivery, and provide instructions for delivering the order 82. It should be appreciated that the method 120 may be carried out for multiple guests at the same time, at overlapping times, and/or at different times (e.g., as the multiple guests enter the dining environment 50 and place respective orders over time).

The method 120 may be carried out according to instructions stored on one or more tangible, non-transitory, machine-readable media and/or may be performed by the processor or the processing circuitry of the delivery system 10 (via the control system 64) described herein or on another suitable controller. The blocks of the method 120 may be performed in any suitable order. Furthermore, certain blocks of the method 120 may be omitted and/or other blocks may be added to the method 120.

In an embodiment, a group of guests may visit the dining environment 50 for the dining experience. The group may stay together and place one order 82 or the group may separate and place multiple orders 82 at multiple point of sale terminals 54 and/or at multiple vendors 52. After placing the order(s) 82, the group may head to the guest area 56 to wait for the order(s) 82. FIG. 7 is an example illustration of the delivery system 10 tracking the one or more attributes of the group of guests 80 within the dining environment 50. For example, the group of guests 80 may include a first guest 80a, a second guest 80b, and a third guest 80c. Each guest of the group may take a different route (e.g., path) within the dining environment 50, but the group may end up at a final location. The final location may be the location where the group of guests may have their dining experience, or the order delivery location.

With reference to FIG. 7, the third guest 80c may take route 150 and head directly to a first table 58a. The first table 58a may be the final location for the group. For example, the group may visit different locations within the dining environment 50, but the group may reconvene at the first table 58a. As such, the third guest 80c may wait at the first table 58a for the other members of the group. The third guest 80c may spend a period of time at the first table 58a greater than a threshold period of time. As such, the delivery system 10 may associate the third guest 80c with the first table 58a. The delivery system 10 may further associate the other members of the group (e.g., second guest 80b, third guest 80c) with the first table 58a.

The first guest 80a may take route 152 and stop at a second table 58b, start a conversation with one or more guests at the second table 58b, then walk to the first table 58a. The first guest 80a may stay at the second table 58b for a period of time that is less than the threshold period of time, and thus, the first guest 80a is not associated with the second table 58b. In an instance, the first guest 80a may stay at the second table 58b for the period of time that is longer than the threshold period of time. In such cases, the first guest 80a may initially be associated with the second table 58b, or other factors may be considered so that the first guest 80a is not associated with the second table 58b even though the period of time is longer than the threshold period of time. For example, the delivery system 10 may determine that the first guest 80a should not be associated with the second table 58b based on the period of time spent at the second table 58b, the movement or gestures made by the first guest 80a at the second table 58b, and/or other guests at the second table 58b. For example, the first guest 80a may kneel or stand by the second table 58b. The delivery system 10 may identify the body position of the first guest 80a as an indication that the second table 58b may be a temporary location. The delivery system 10 may also factor in the group formation and the third guest 80c waiting at the first table 58a (e.g., if the first guest 80a is part of the group, and another member of the group has established their location, the threshold time and/or other factors utilized in order for the first guest 80a to establish the association with a different location may increase). Thus, the delivery system 10 may not form an association between the first guest 80a and the second table 58b. Indeed, the first guest 80a may leave the second table 58b and go to the first table 58a. Should the first guest 80a be associated with the second table 58b, the delivery system 10 may determine that a break event has occurred and may then break the association between the first guest 80a and the second table 58b, and then form another association between the first guest 80a and the first table 58a upon receipt of sufficient information.

The second guest 80b may take route 154 within the dining environment 50. The second guest 80b may visit a temporary location (e.g., station 60) before arriving at the first table 58a. For example, the second guest 80b may visit the restroom, the hand sanitizing station, the drink station, or the condiment station. The delivery system 10 may identify the station 60 as a temporary location rather than the order delivery location. Even if the second guest 80b spends a period of time at the station 60 greater than the threshold period of time, the delivery system 10 may not associate the second guest 80b with the station 60. In this way, the delivery system 10 may distinguish between the areas of the dining environment 50.

While tracking the one or more attributes of the guests 80a, 80b, 80c within the dining environment 50, the delivery system 10 may also passively update the map. For example, the group of guests may combine the first table 58a with a third table 58c. The delivery system 10 may identify the first table 58a and the third table 58c moving locations and/or changing configurations. The delivery system 10 may further identify the third guest 80c sitting at the first table 58a and the first guest 80a and the second guest 80b sitting at the third table 58c. The delivery system 10 may update the map and provide an indication of the update to the vendor 52. The delivery system 10 may also provide instructions to provide the order based on the updated map. In this way, the delivery system 10 may provide accurate instructions for order delivery.

Figure 8:
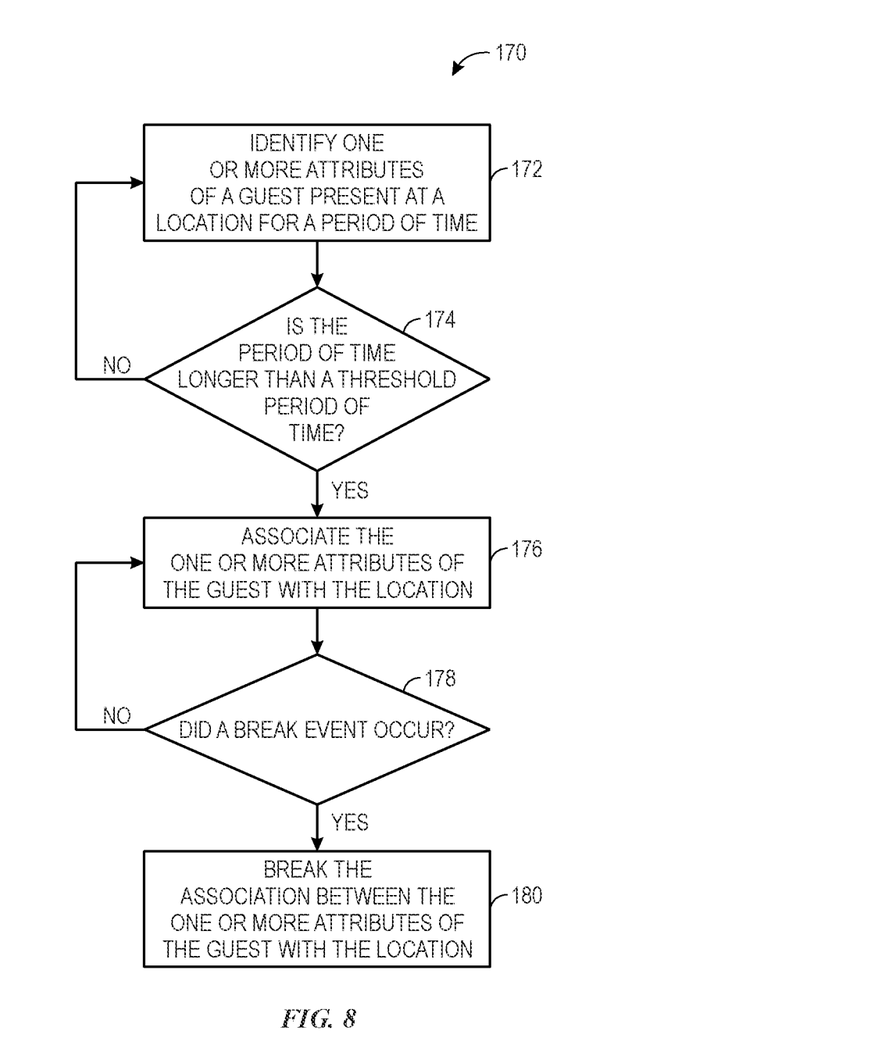

FIG. 8 is an example method 170 for associating the one or more attributes of the guest 80 with a location and determining if a break event occurred. As described herein, the guest 80 may take any route of a variety of different routes available within the dining environment 50 to arrive at the location. For example, the guest 80 may stop by a first location to chat with friends, visit a condiment station, stop by the restroom, or the like. The guest 80 may stop at the first location (e.g., table, seat) and stay at the first location for a period of time. If the period of time is greater than a threshold period of time, then the delivery system 10 may associate the one or more attributes of the guest 80 with the first location. However, the guest 80 may decide to move to a second location (e.g., final location; order delivery location). As such, the delivery system 10 may determine if a break event occurred and if a new association may be formed with the second location. In this way, the delivery system 10 may determine the location of the guest 80 to accurately and efficiently facilitate delivery of the order.

At block 172, the delivery system 10 may identify one or more attributes of a guest 80 present at a location for a period of time. For example, the delivery system 10 may identify the guest 80 at a first table 58a and may monitor the image data over time. In an instance, the guest 80 may enter the guest area 56 and sit at the first table 58a. The guest 80 may talk to another guest, browse their phone, observe the dining environment 50, or the like at the first table 58a. The delivery system 10 may identify these behaviors and correlate these behaviors to an intent of the guest to establish the first table 58a as their location for order delivery.

At block 174, the delivery system 10 may determine if the period of time spent at the location is greater than a threshold period of time. The threshold period of time may be an amount of time determined by the delivery system 10, via machine learning or artificial intelligence, that may be indicative of the guest 80 claiming the first table 58a or otherwise intending to establish the first table 58a as their location for order delivery. The threshold period of time may vary based on any of a variety of factors, such as movement or gestures made by the guest at the table, any items placed on the table, any other guests at the table, a respective time spent at other locations, or the like. To monitor the image data, the delivery system 10 may start a clock or timer to monitor the period of time the guest 80 may spend at the first table 58a. Additionally or alternatively, the delivery system 10 may identify time stamps within the image data. As such, the delivery system 10 may track the period of time the one or more attributes of the guest 80 may be present at the first table 58a and compare the period of time to the threshold period of time.

If the time spent at the location is not greater than the threshold period of time, then the delivery system 10 may not associate the guest 80 with the location. After the period of time, the guest 80 may leave the first table 58a and walk to a second table 58b. The guest 80 may stand, sit, kneel, lean on, or walk by the second table 58b. For example, the guest 80 may talk to another guest 80 located at the second table 58b and join the other guest 80 at the second table 58b. The delivery system 10 may not associate the guest 80 with the first table 58 and monitor the image data over time to determine if the guest 80 may be associated with the second table 58b. As such, the example method 170 may return to block 172 and identify the one or more attributes of the guest 80 present at the second table 58 for a period of time.

If the period of time spent at the location is greater than the threshold period time, then at block 176, the delivery system 10 may associate the one or more attributes of the guest 80 with the location. For example, the guest 80 may sit at the first table 58a to wait for their order 82. In other words, the guest 80 may claim the table for their dining experience. The period of time the guest 80 spends at the first table waiting for their order 82 may be greater than the threshold period of time. As such, the delivery system 10 may associate the one or more attributes of the guest 80 with the first table 58a.

At block 178, the delivery system 10 may determine if a break event occurred. In an instance, the guest 80 may leave the first table 58a and the delivery system 10 may determine if the break event occurred. That is, the delivery system 10 may determine if the association may be broken. To identify a break event, the delivery system 10 may take into account a variety of factors, such as a respective time at the table, a respective time away from the table, a type of the additional location, movement or gestures made by the guest at the table and/or away from the table, personal possessions 90e left at the table, other guests at the table, or the like.

If the break event did not occur, then the delivery system 10 may return to block 176 and maintain the association of the one or more attributes of the guest 80 with the first table 58a. For example, the guest 80 may leave one or more personal possessions, such as a water bottle or a jacket, at the first table 58a and visit the station 60. The delivery system 10 may determine that the personal possessions and the station 60 may be indicative of the guest 80 coming back to the first table 58a. That is, the station 60 may be a temporary location. As such, the delivery system 10 may determine that the break event may not occur. In another example, the guest 80 may go to the second table 58b and talk to other guests 80. The guest 80 may stand by the second table 58b. The delivery system 10 may identify the standing position of the guest 80 as an intention to return to the first table 58a. As such, the delivery system 10 may not determine leaving the first table 58a as the break event. The method 170 may return to block 176 and the delivery system 10 may maintain the association of the one or more attributes of the guest 80 with the first table 58a.

If the break event occurred, then at block 180, the delivery system 10 may break the association between the one or more attributes of the guest 80 with the location. For example, the guest 80 may sit at the second table 58b and begin a conversation with other guests at the second table 58. The guest 80 may stay at the second table 58b for a period of time longer than the threshold period of time. The delivery system 10 may identify staying at the second table 58b as the break event. In another example, the delivery system 10 may recognize that the guest 80 may have completed the dining experience. For example, the guest 80 may pack their personal possessions 90e and prepare to leave the dining environment 50. The guest 80 may also clean the first table 58a by taking a plate, a tray, a box, or the like to a trash station. As such, the delivery system 10 may understand that the guest 80 may be planning to leave the dining environment 50. The delivery system 10 may identify the guest 80 leaving the first table 58a as the break event and break the association between the one or more attributes of the guest 80 and the location. Accordingly, the delivery system 10 may classify certain actions and/or combinations of actions taken by the guest 80 via computer vision techniques, which may enable the delivery system 10 to accurately determine that it is appropriate to create and/or to end the association with the location for order delivery.

The method 170 may be stored on one or more tangible, non-transitory, machine-readable media and/or may be performed by the processor or the processing circuitry of the control system described above or on another suitable controller. The steps of the method 170 may be performed in the order disclosed above or in any other suitable order. Furthermore, certain steps of the method may be omitted and/or other blocks may be added to the method 170.

As used herein, 'machine learning' and/or 'computer vision' may refer to algorithms and statistical models that computer systems use to perform a specific task with or without using explicit instructions. For example, a machine learning process may generate a mathematical model based on a sample of clean data, known as "training data," in order to make predictions or decisions without being explicitly programmed to perform the task. The delivery system 10 may generate (e.g., train and/or update, such as passively update) the model based on image data collected over time. In this way, the model may improve over time based on new image data collected over time. For example, the model may receive image data in order to provide outputs related to creating and/or to breaking the association, and the image data may then also be used to update and refine the model.

It is well understood that the use of PII should follow privacy policies and practices that are generally recognized as meeting or exceeding industry or governmental requirements for maintaining the privacy of users. In particular, personally identifiable information data should be managed and handled so as to minimize unintentional or unauthorized access or use, and the nature of authorized use should be clearly indicated to users.

While only certain features of the invention have been illustrated and described herein, many modifications and changes will occur to those skilled in the art. It is, therefore, to be understood that the appended claims are intended to cover all such modifications and changes as fall within the true spirit of the invention. It should be appreciated that any features shown and described with reference to FIGS. 1-5 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function)" or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A delivery system, comprising:
   one or more processors;
   memory storing instructions executable by the one or more processors to cause the one or more processors to:
      identify one or more attributes of a user in one or more images captured by one or more cameras;
      associate the one or more attributes of the user with an order placed by the user;
      track the one or more attributes of the user in the one or more images over time to identify movement of the user within an environment;
      in response to the one or more attributes of the user in the one or more images remaining at a location for more than a threshold time, create an association between the one or more attributes of the user and the location; and
      provide an instruction to deliver items in the order to the location.

2. The delivery system of claim 1, wherein the location comprises a table or a seat in a dining environment.

3. The delivery system of claim 1, wherein the instructions are executable by the one or more processors to cause the one or more processors to analyze the one or more images to determine that the order was placed by the user.

4. The delivery system of claim 3, wherein the instructions are executable by the one or more processors to cause the one or more processors to analyze the one or more images to identify an order number on a display screen in the environment to thereby determine that the order was placed by the user.

5. The delivery system of claim 1, wherein the instructions are executable by the one or more processors to cause the one or more processors to:
   identify the one or more attributes of the user at an additional location for more than the threshold time; and
   in response to the one or more attributes of the user being at the additional location for more than the threshold time, break the association between the one or more attributes of the user and the location.

6. The delivery system of claim 1, wherein the instructions are executable by the one or more processors to cause the one or more processors to:
   identify the one or more attributes of the user at an additional location;
   reference a map of the environment to determine that the additional location is a temporary location; and
   in response to the additional location being the temporary location, maintain the association between the one or more attributes of the user and the location.

7. The delivery system of claim 1, wherein the one or more attributes are anonymous attributes that do not provide an identity of the user.

8. The delivery system of claim 7, wherein the one or more attributes comprise a hair color, a hairstyle, a clothing item shape, a clothing item color, an accessory, an object carried by the user, a gait, a head shape, or any combination thereof.

9. The delivery system of claim 1, wherein the instructions are executable by the one or more processors to cause the one or more processors to:
   identify one or more respective attributes of an additional user in the one or more images captured by the one or more cameras;
   associate the one or more respective attributes of the additional user with an additional order placed by the additional user;
   track the one or more respective attributes of the additional user in the one or more images over time to identify respective movement of the additional user within the environment;
   in response to the one or more respective attributes of the additional user in the one or more images remaining at the location for more than the threshold time, create an additional association between the one or more respective attributes of the additional user and the location; and
   provide the instruction to deliver the items in the order and the respective items in the additional order to the location.

10. The delivery system of claim 9, wherein the instructions are executable by the one or more processors to cause the one or more processors to:
    form the user and the additional user into a group in response to the association and the additional association existing together over a time period;
    receive an indication that the items in the order and the respective items in the additional order are ready for delivery to the location at a delivery time; and
    in response to analysis of the one or more attributes of the user and the one or more additional attributes of the additional user in the one or more images indicating that at least one of the user and the additional user is present at the location at the delivery time, provide the instruction to deliver the items in the order and the respective items in the additional order to the location.

11. The delivery system of claim 1, wherein the instructions are executable by the one or more processors to cause the one or more processors to:
provide the instruction that indicates the location for visualization by a server; and
withhold the one or more attributes from the server.

12. A method of operating a delivery system, the method comprising:
identifying, using one or more processors, one or more attributes of a user in one or more images captured by one or more cameras;
associating, using the one or more processors, the one or more attributes of the user with an order placed by the user;
tracking, using the one or more processors, the one or more attributes of the user in the one or more images over time to identify movement of the user within an environment;
creating, using the one or more processors, an association between the one or more attributes of the user and a location in response to the one or more attributes of the user in the one or more images remaining at the location for more than a threshold time; and
providing, using the one or more processors, an instruction to deliver items in the order to the location.

13. The method of claim 12, comprising analyzing, using the one or more processors, the one or more images to determine that the order was placed by the user.

14. The method of claim 12, comprising:
identifying, using the one or more processors, the one or more attributes of the user at an additional location for more than the threshold time; and
breaking, using the one or more processors, the association between the one or more attributes of the user and the location in response to the one or more attributes of the user being at the additional location for more than the threshold time.

15. The method of claim 12, comprising:
identifying, using the one or more processors, the one or more attributes of the user at an additional location;
referencing, using the one or more processors, a map of the environment to determine that the additional location is a temporary location; and
maintaining, using the one or more processors, the association between the one or more attributes of the user and the location in response to the additional location being the temporary location.

16. The method of claim 12, comprising blocking, using the one or more processors, output of the one or more images and the one or more attributes of the user in the environment, such that the one or more images and the one or more attributes are not disclosed to personnel in the environment.

17. A delivery system, comprising:
one or more processors;
memory storing instructions executable by the one or more processors to cause the one or more processors to:
identify one or more attributes of a user in one or more images captured by one or more cameras;
associate the one or more attributes of the user with an order placed by the user;
track the one or more attributes of the user in the one or more images over time to identify movement of the user within an environment;
in response to the one or more attributes of the user in the one or more images remaining at a location for more than a threshold time, create an association between the one or more attributes of the user and the location; and
provide an output that indicates the location to facilitate delivery of items in the order to the location without displaying the one or more images to personnel associated with the environment.

18. The delivery system of claim 17, wherein the output comprises a map of the environment that indicates the location.

19. The delivery system of claim 18, wherein the instructions are executable by the one or more processors to cause the one or more processors to update the map to represent respective current positions of structures in the environment based on the image data.

20. The delivery system of claim 17, wherein:
the instructions identify the one or more attributes of the user at an additional location;
reference a map of the environment to determine that the additional location is a temporary location; and
in response to the additional location being the temporary location, maintain the association between the one or more attributes of the user and the location.

* * * * *